(12) United States Patent
Nathoo

(10) Patent No.: US 8,417,701 B2
(45) Date of Patent: Apr. 9, 2013

(54) GENERATION OF A CATEGORIZATION SCHEME

(75) Inventor: Amir Nathoo, Cambridge (GB)

(73) Assignee: International Business Machines Corporation, Armonk, NY (US)

( * ) Notice: Subject to any disclaimer, the term of this patent is extended or adjusted under 35 U.S.C. 154(b) by 1182 days.

(21) Appl. No.: 11/562,451

(22) Filed: Nov. 22, 2006

(65) Prior Publication Data

US 2007/0118541 A1    May 24, 2007

(30) Foreign Application Priority Data

Nov. 24, 2005  (GB) .................................. 0524017.1

(51) Int. Cl.
   *G06F 17/30*    (2006.01)
(52) U.S. Cl.
   USPC ........................................................ 707/736
(58) Field of Classification Search .............. 707/3, 101, 707/102, 104.1, 714, 736; 709/223
   See application file for complete search history.

(56) References Cited

U.S. PATENT DOCUMENTS

| | | | |
|---|---|---|---|
| 6,510,434 | B1 | 1/2003 | Anderson et al. |
| 6,668,254 | B2 * | 12/2003 | Matson et al. ................... 707/10 |
| 6,721,754 | B1 * | 4/2004 | Hurst et al. .................... 707/714 |
| 7,246,128 | B2 * | 7/2007 | Jordahl .......................... 707/100 |
| 2001/0016846 | A1 | 8/2001 | Chakrabarti et al. |
| 2002/0055932 | A1 * | 5/2002 | Wheeler et al. ............ 707/104.1 |
| 2004/0078386 | A1 * | 4/2004 | Moon et al. .................... 707/102 |
| 2005/0060324 | A1 * | 3/2005 | Johnson et al. ............... 707/100 |
| 2005/0060345 | A1 | 3/2005 | Doddington |

FOREIGN PATENT DOCUMENTS

| | | |
|---|---|---|
| EP | 0822502 A | 2/1998 |
| EP | 1324220 A1 | 7/2003 |
| EP | 1457885 A | 9/2004 |
| WO | WO9412944 A1 | 6/1994 |

OTHER PUBLICATIONS

Palomar, Manuel et al., "Reducing Inconsistency in Integrating Data from Different Sources" 2001, p. 209-218.*
Carvalho, Joyce C., et al., "Finding Identities among Objects from Mulitple Web Sources" Nov. 8, 2003, p. 90-93.*
Baldazo R: "Navigating with a Web Compass", BYTE, McGraw-Hill, Inc. St. Peterborough, US, vol. 21, No. 3, Mar. 1, 1996, ISSN: 0360-5280—the whole document.

* cited by examiner

*Primary Examiner* — Etienne Leroux
(74) *Attorney, Agent, or Firm* — Cuenot, Forsythe & Kim, LLC

(57) ABSTRACT

A method for generating a categorization scheme including a set of one or more categories for a collection of data items, each data item including at least one data element having an element name and an element value, the method comprising the steps of: identifying a common data element for each one of the data items, each of the identified common data elements having equivalent element names; compiling a collection of element values comprising an element value for each of the common data elements; and defining the set of one or more categories to contain the different values in the collection of element values.

21 Claims, 10 Drawing Sheets

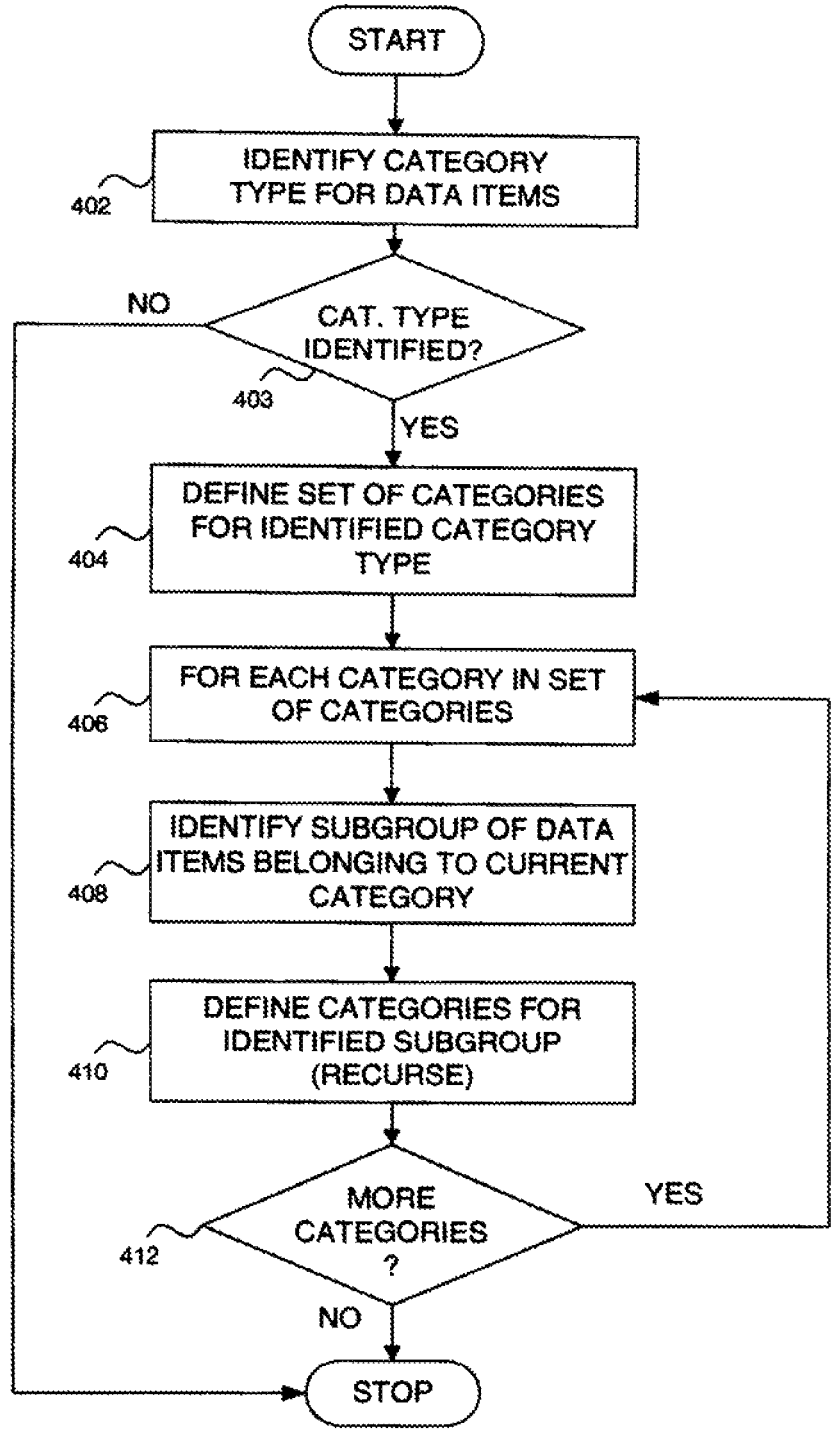

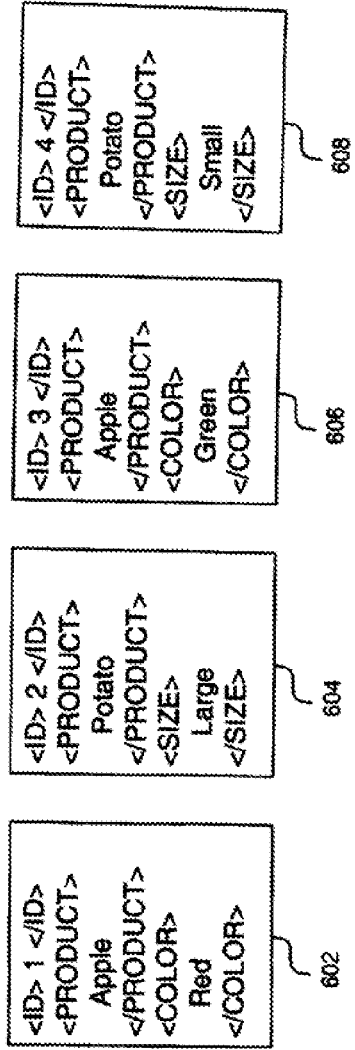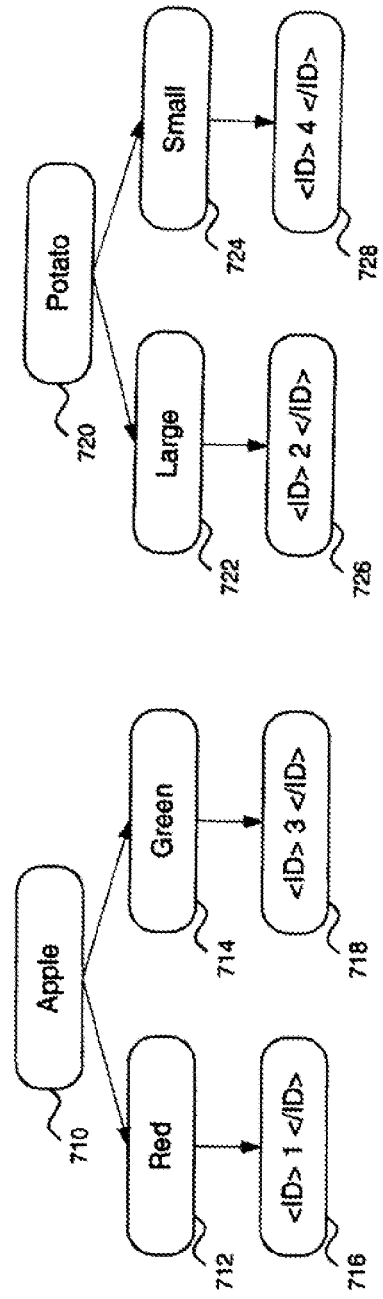

FIGURE 9

902:
```
<TRANSMISSION>
  Manual
</TRANSMISSION>
<CONFIGURATION>
  <STYLE>
    Convertible
  </STYLE>
  <DOORS>
    2
  </DOORS>
  <COL>
    Red
  </COL>
</CONFIGURATION>
```

904:
```
<BODY>
  Convertible
</BODY>
<XMISSION>
  Automatic
</XMISSION>
<DOORS>
  2
</DOORS>
```

906:
```
<VEHICLETYPE>
  Convertible
</VEHICLETYPE>
<ENGINESIZE>
  2.8l
</ENGINESIZE>
<TECHNICAL>
  <GEARBOX>
    Manual
  </GEARBOX>
  <AUTOOPTION>
    No
  </AUTOOPTION>
  <CRUISE>
    Yes
  </CRUISE>
</TECHNICAL>
<COLOR>
  Green
</COLOR>
```

908:
```
<STYLE>
  Convertible
</STYLE>
<SPECIFICATION>
  <COSMETIC>
    <COLOR>
      Red
    </COLOR>
    <HOOD>
      Red
    </HOOD>
  </COSMETIC>
  <TECHNICAL>
    <XMISSION>
      Automatic
    </XMISSION>
    <ENGINE>
      3l
    </ENGINE>
  </TECHNICAL>
</SPECIFICATION>
```

GENERATION OF A CATEGORIZATION SCHEME

FIELD OF THE INVENTION

The present invention relates to the generation of a categorization scheme. In particular, it relates to generating a categorization scheme dynamically for a group of data items.

BACKGROUND OF THE INVENTION

It is a common requirement to combine formatted data originating from potentially disparate data sources employing different data formats into a single common data categorization scheme. For example, product information for different, related or identical products originating from different product suppliers can be formatted differently by each supplier. A single recipient of such data (such as a central Product Information Management System) requires a common data categorization scheme suitable for receiving and categorizing the differing product information in a useful way.

FIG. 1 illustrates a mapping system for data originating from disparate data sources to a common data categorization scheme in the prior art. Disparate data sources 102, 104 and 106 provide data items having differing formats. For example, data sources 102, 104 and 106 provide data items formatted as XML documents, although alternative data formats could be used. Such data items are formatted to include one or more data elements such that each data element includes an element name and an element value. For example, a simple data item can be defined in XML as:

```
<ProductType> Apple </ProductType>
<Color> GREEN </Color>
```

Exemplary Data Item 1

Exemplary data item 1 has two elements: ProductType; and Color. The ProductType element has an associated value of "Apple" and the Color element has an associated value of "GREEN". The particular format of the elements of data (i.e. their names, data types and nesting) will differ between data sources. For example, an alternative format for a similar data item might be:

```
<UniqueID> 8392 </UniqueID>
<Specification>
    <Type> Apple </Type>
    <Variety> Granny Smith </Variety>
    <Color> GREEN </Color>
    <Size> LARGE </Size>
    <Origin> United Kingdom </Origin>
</Specification>
```

Exemplary Data Item 2

Exemplary data item 2 includes further details as additional data elements nested within a Specification data element, including Type, Variety, Size and Origin. A requirement exists for all data to be available in a single common data categorization scheme 114, such as a Product information Management System. To categorize data from each of the disparate data sources 102, 104 and 106 it is necessary to first define an appropriate categorization structure of the common categorization scheme 114. An appropriate categorization structure includes a definition of one or more categories, and such a definition will be partly determined by the data items themselves. For example, factors such as the particular data elements present in data items and the values associated with such elements will influence the structure of the common categorization scheme 114.

It is further necessary to define a data mapping 108, 110 and 112 to map data items from each data source 102, 104 and 106 to the common categorization scheme 114. The data mappings 108, 110 and 112 define how elements of formatted data items from each of the data sources 102, 104 and 106 are to be categorized into the common data categorization scheme 114. For example, an appropriate categorization for the exemplary data items above may be to categorize by the product type, which is defined as ProductType in data item 1 and Specification->Type ('->' indicating that Type is a nested element within Specification) in data item 2. This represents an element with a common meaning in both data items, despite the naming and nesting conventions differing. The ProductType element in data item 1 is a root data element (i.e. it is not nested within other data elements), whilst the Type element in data item 2 is a nested data element (within Specification), Such differing formats of data items and differing terminology in the naming of data elements require that the format of each data item to be mapped into such a categorization scheme using mappings 108, 110 and 112 which may need to be defined manually.

Whilst the arrangement of FIG. 1 is effective in providing a common data categorization 114 for data items having different formats, the arrangement is reliant upon an appropriately defined common categorization scheme 114 and appropriately defined mappings 108, 110 and 112 between each data source and the common categorization scheme 114. These mappings need to be defined in view of both the format of data from a data source and the required categorization. There is therefore a tight coupling between the data sources 102, 104 and 106 and the common categorization scheme 114 in the form of the mappings 108, 110 and 112. This approach further incurs a high overhead in defining the mappings which can be both time consuming and costly. An additional disadvantage of such a tightly coupled arrangement is that the common categorization scheme 114 cannot be defined dynamically in response to a new data item having a new format. Such a new format would require the definition of a new mapping and possible amendments to the categorization scheme 114 itself to accommodate the new data item.

Thus it would be advantageous to provide for the dynamic generation of a categorization scheme for data items of disparate origin and/or format without a need for the generation of an intermediate mapping between data items and the categorization scheme.

SUMMARY OF THE INVENTION

The present invention accordingly provides, in a first aspect, a method for generating a categorization scheme including a set of one or more categories for a collection of data items, each data item including at least one data element having an element name and an element value, the method comprising the steps of: identifying a common data element for each one of the data items, each of the identified common data elements having equivalent element names; compiling a collection of element values comprising an element value for each of the common data elements, and defining the set of one or more categories to contain the different values in the collection of element values.

In this way a categorization scheme for a group of data items is generated based upon the identification of common data elements within the group of data items. The commonality of data elements is based on the names of the data elements, and the categories are defined as individual values in the data items for common data elements. Thus the method provides for the dynamic generation of a categorization scheme for data items of disparate origin and/or format without a need for the generation of an intermediate mapping between data items and the categorization scheme.

Preferably, the method further comprises the steps of: identifying a first common data element for each one of the data items, each of the first common data elements having an equivalent element name; identifying a second common data element for each one of the data items, each of the second common data elements having an equivalent element name; compiling a first collection of element values comprising an element value for the first common data element in each data item of the collection of data items; compiling a second collection of element values comprising an element value for the second common data element in each data item of the collection of data items; defining a first set associated with the first common data element, the first set containing the different values in the first collection of element values; defining a second set associated with the second common data element, the second set containing the different values in the second collection of element values; identifying the common data element associated with the smaller of the first and second sets.

Preferably the equivalence of element names includes synonymous names.

Preferably equivalence of element names is defined in a table of equivalences.

Preferably an identified common data element for a data item is a leaf data element in the data item.

The present invention accordingly provides, in a second aspect, a system for generating a categorization scheme including a set of one or more categories for a collection of data items, each data item including at least one data element having an element name and an element value, the system comprising: means for identifying a common data element for each one of the data items, each of the identified common data elements having equivalent element names; means for compiling a collection of element values comprising an element value for each of the common data elements; and means for defining the set of one or more categories to contain the different values in the collection of element values.

The present invention accordingly provides, in a third aspect, an apparatus comprising: a central processing unit; a memory subsystem; an input/output subsystem; and a bus subsystem interconnecting the central processing unit, the memory subsystem, the input/output subsystem; and the system as described above.

The present invention accordingly provides, in a fourth aspect, a computer program element comprising computer program code to, when loaded into a computer system and executed thereon, cause the computer to perform the steps of a method as described above.

BRIEF DESCRIPTION OF THE DRAWINGS

A preferred embodiment of the present invention will now be described, by way of example only, with reference to the accompanying drawings, in which:

FIG. 4 is a flowchart of a method for defining categories in the categorization scheme of FIG. 3a for a group of data items in accordance with a preferred embodiment of the present invention;

FIG. 6 illustrates an exemplary group of data items suitable for being processed by a preferred embodiment of the present invention to generate a categorization scheme;

FIG. 7 illustrates a categorization scheme arising from an application of a preferred embodiment of the present invention to the exemplary group of data items of FIG. 6;

FIG. 9 illustrates an exemplary group of data items suitable for being processed by a preferred or an alternative embodiment of the present invention to generate a categorization scheme.

DETAILED DESCRIPTION OF THE PREFERRED EMBODIMENT

Figure 1:
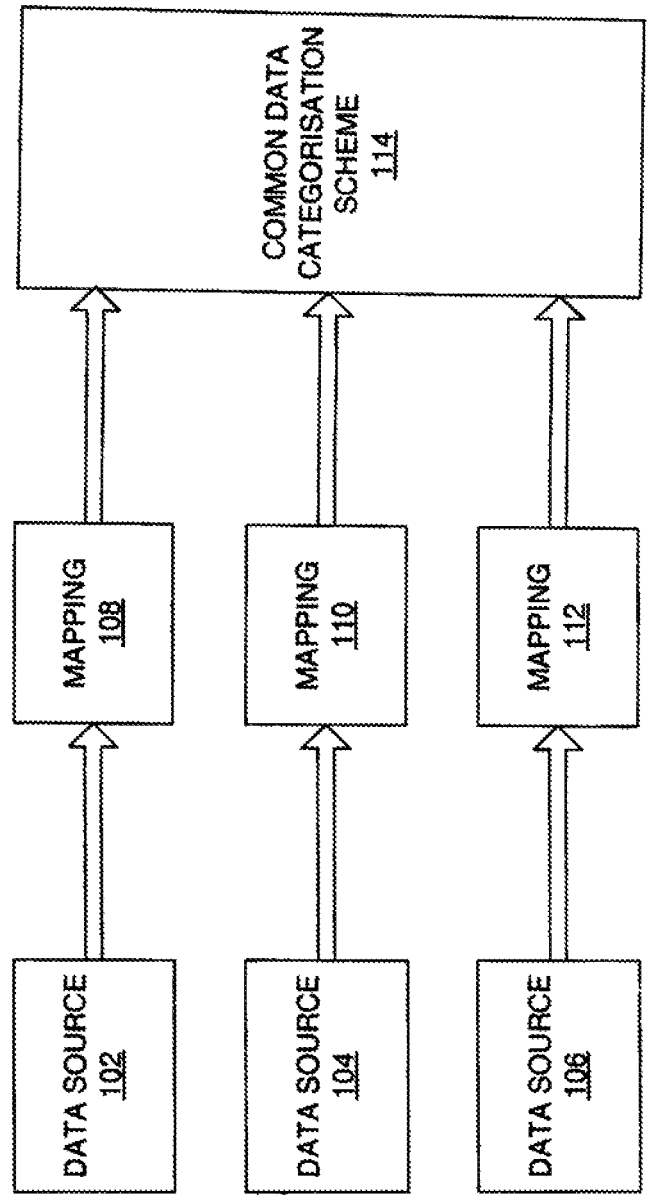
FIG. 1 illustrates a mapping system for data originating from disparate data sources to a common data categorization scheme in the prior art.
Figure 2:
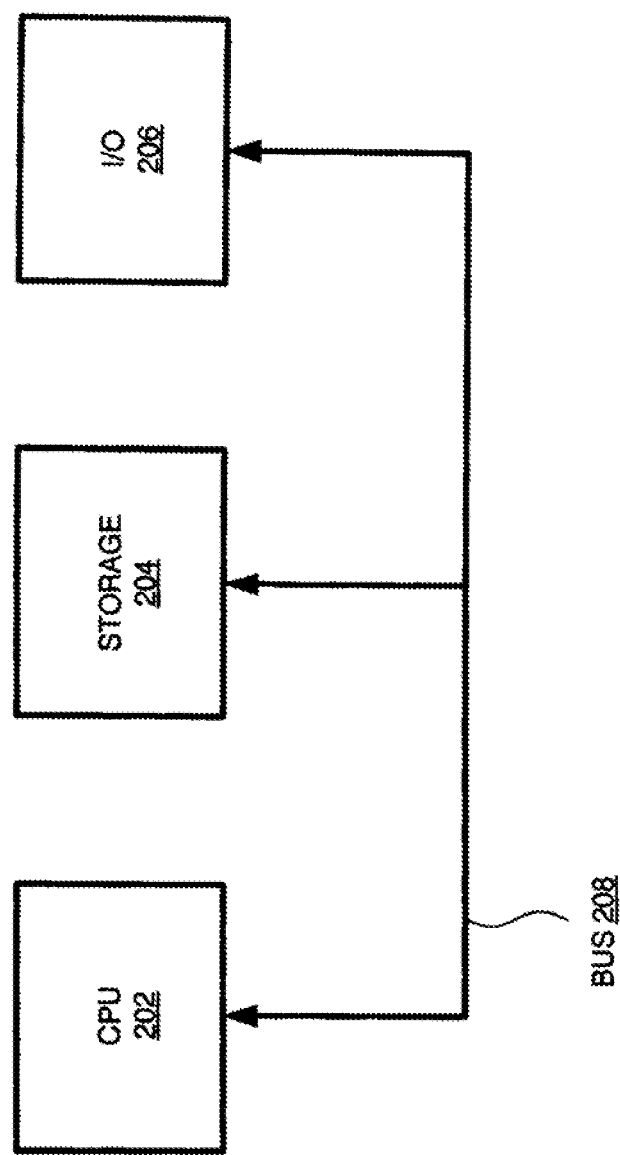
FIG. 2 is a block diagram of a computer system suitable for the operation of embodiments of the present invention.

FIG. 2 is a block diagram of a computer system suitable for the operation of embodiments of the present invention, A central processor unit (CPU) 202 is communicatively connected to a storage 204 and an input/output (I/O) interface 206 via a data bus 208. The storage 204 can be any read/write storage device such as a random access memory (RAM) or a non-volatile storage device. An example of a non-volatile storage device includes a disk or tape storage device. The I/O interface 206 is an interface to devices for the input or output of data, or for both input and output of data. Examples of I/O devices connectable to I/O interface 206 include a keyboard, a mouse, a display (such as a monitor) and a network connection.

Figure 3A:
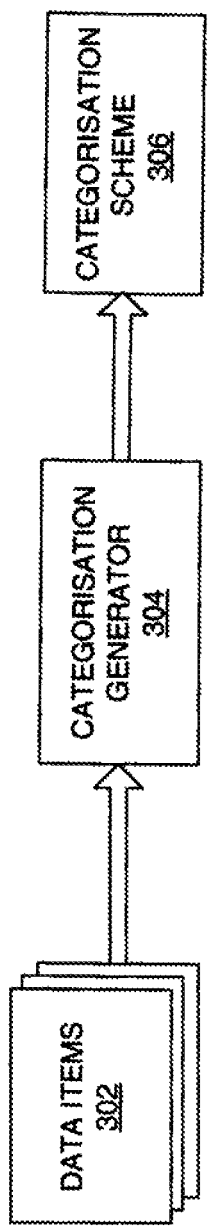
FIG. 3a is a block diagram of an arrangement for generating a categorization scheme derived from a group of data items in accordance with a preferred embodiment of the present invention.

FIG. 3a is a block diagram of an arrangement for generating a categorization scheme 306 derived from a group of data items 302 in accordance with a preferred embodiment of the present invention. Each data item in the group of data items 302 can originate from a disparate data source and can potentially have different formats. For example, data items 302 are formatted as XML documents, although it will be appreciated that any other document format including data elements having names and values (or attributes and contents) could be employed. The categorization scheme 306 includes a set of one or more categories into which each of the data items 302 can be categorized, as is described in detail below with respect to FIG. 3b. The categorization scheme 306 is generated by the categorization generator 304 which is a software or hardware component employing logic operating means. For example, the categorization generator 304 is a software routine executing on a computer system such as a system in accordance with FIG. 2. The categorization generator 304 accesses each data element within each data item in the group of data items 302 to define a set of categories for the categorization scheme 306. Methods of the categorization generator 304 are considered in detail below with respect to FIGS. 4, 5a and 5b.

Figure 3B:
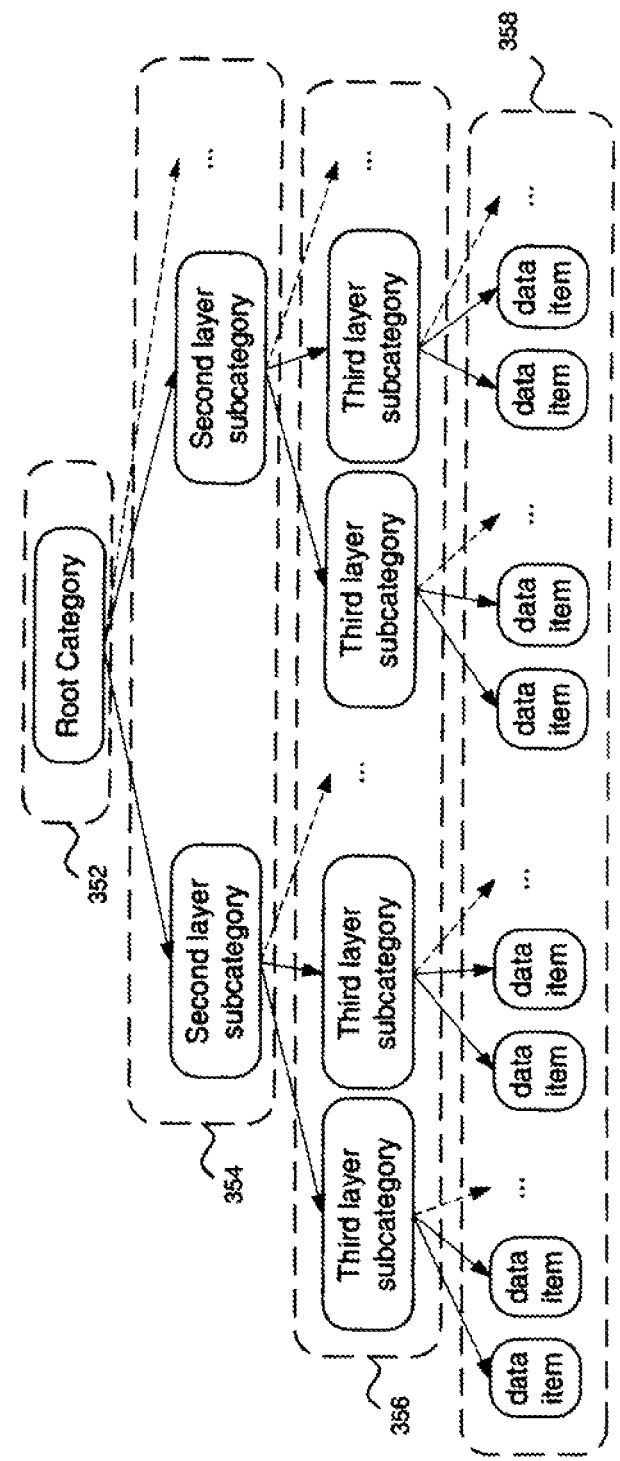
FIG. 3b illustrates an exemplary structure of the categorization scheme of FIG. 3a derived from the group of data items by the categorization generator in accordance with a preferred embodiment of the present invention.

FIG. 3b illustrates an exemplary structure of the categorization scheme 306 of FIG. 3a derived from the group of data items 302 by the categorization generator 304 in accordance with a preferred embodiment of the present invention. The categorization scheme 306 is a set of categories arranged into the form of a tree data structure and can be represented in a volatile or non-volatile memory of a computer system. Nodes in the tree data structure correspond to categories within the categorization scheme 306. A first layer category 352 includes a single root category into which all categorized data items 358 will fall. For example, consider a small group of data items each having a data element named Product, and each Product data element having the value "Apple". Such a group of data items can be readily categorized by Product, with the root category in the first layer category 352 being "Apple". This is possible since all data items will fall into the root category of "Apple" because all data items have a Product value of "Apple". The root category is therefore "Apple" and has a category type of Product. A category type is a class of category for all categories in a particular layer of the categorization scheme 306 data structure.

It is possible for a categorization scheme 306 to include multiple root categories (i.e. Multiple category trees) reflecting different categorizations. Although the description here relates to categorization schemes 306 having a single root category, it will be appreciated that the concepts are readily extendible to a categorization scheme 306 having multiple root categories.

A categorization scheme 306 having sub-categories will include multiple layers of categories. Sub-categorizations of the first layer category 352 are represented as subsequent layers of categories within the tree data structure. For example, second layer sub-categories 354 is a set of sub-categories of the root category in the first layer category 352. All sub-categories 354 in the second layer 354 will have the same category type (for example, a Color attribute for an apple), but will have different category values (such as "Red" and "Green" for apples). Similarly, third layer sub-categories 356 are each sub-categories of their respective parent categories in the second layer 354. All subcategories 356 in the third layer 356 will have the same category type (for example, a Variety attribute for an apple) but will have different category values (such as "Granny Smith", "Cox" etc.). There can potentially be any number of subcategory layers depending upon the number of common category types in a group of data items, as is described in detail below with respect to FIGS. 4, 5a and 5b.

FIG. 4 is a flowchart of a method of the categorization generator 304 of FIG. 3a for defining categories in a categorization scheme 306 for a group of data items 302 in accordance with a preferred embodiment of the present invention. Initially, at step 402, the method identifies a category type for the group of data items 302. The category type is a class of categories for which individual categories are generated having particular values within the class. For example, Product is a class of categories, although "Apple" is a particular category. The category type is identified to be a name of a data element which is common in all data items in the group of data items. For example, if each data item in a group of data items 302 includes a data element named Product, then Product could be a category type for the group of data items. A method for identifying a category type for a group of data items is described in detail below with respect to FIG. 5a.

At step 403 the method determines whether a category type is identified. If not, the method terminates (since there are no common data elements for all data items) and categorization ceases at the current level of the categorization scheme.

Subsequently, at step 404, a set of categories is defined for the identified category type. Each category is defined to be a value of a data element having the name of the identified category type. For example if a first data item in a group of data items has a Product data element with a value of "Apple", and a second data item has a Product data element with a value of "Orange", two categories would be defined: "Apple"; and "Orange". The set of categories is defined such that each unique category appears once and only once, hence it is a proper set of categories. Alternatively, step 404 for defining a set of categories could be complemented by the use of an interactive tool allowing a user to interact with the method of FIG. 4 to specify category names for the identified category type, At step 406 a loop is initiated through each category in the set of categories. For each category step 408 identifies a sub-group of the group of data items 302 which belong to the current category and step 410 recurses the method of FIG. 4 for the identified sub-group to define categories (sub-categories) for that sub-group. Subsequently, at step 412, the method determines if more categories are to be processed and continues the loop to step 406 accordingly. In this way the method of FIG. 4 generates a set of categories for a current layer in the categorization scheme and further recurses to generate appropriate sub-categories for sub-groups of data items. It will be appreciated that whilst the method of FIG. 4 is described as being recursive, it could equivalently be implemented in an imperative iterative manner to achieve an identical effect. Additionally, in order to avoid a sub-category type being identical to its parent category type, data elements relating to a parent category can be removed from the sub-group of data items before recursing the method of FIG. 4. Further, it will be appreciated that whilst the method of FIG. 4 includes a set of categories being identified for an identified category type at step 404, a root category in a categorization scheme 306 will include only a single category, and so for the generation of a root category the set of categories includes only a single category.

Figure 5A:
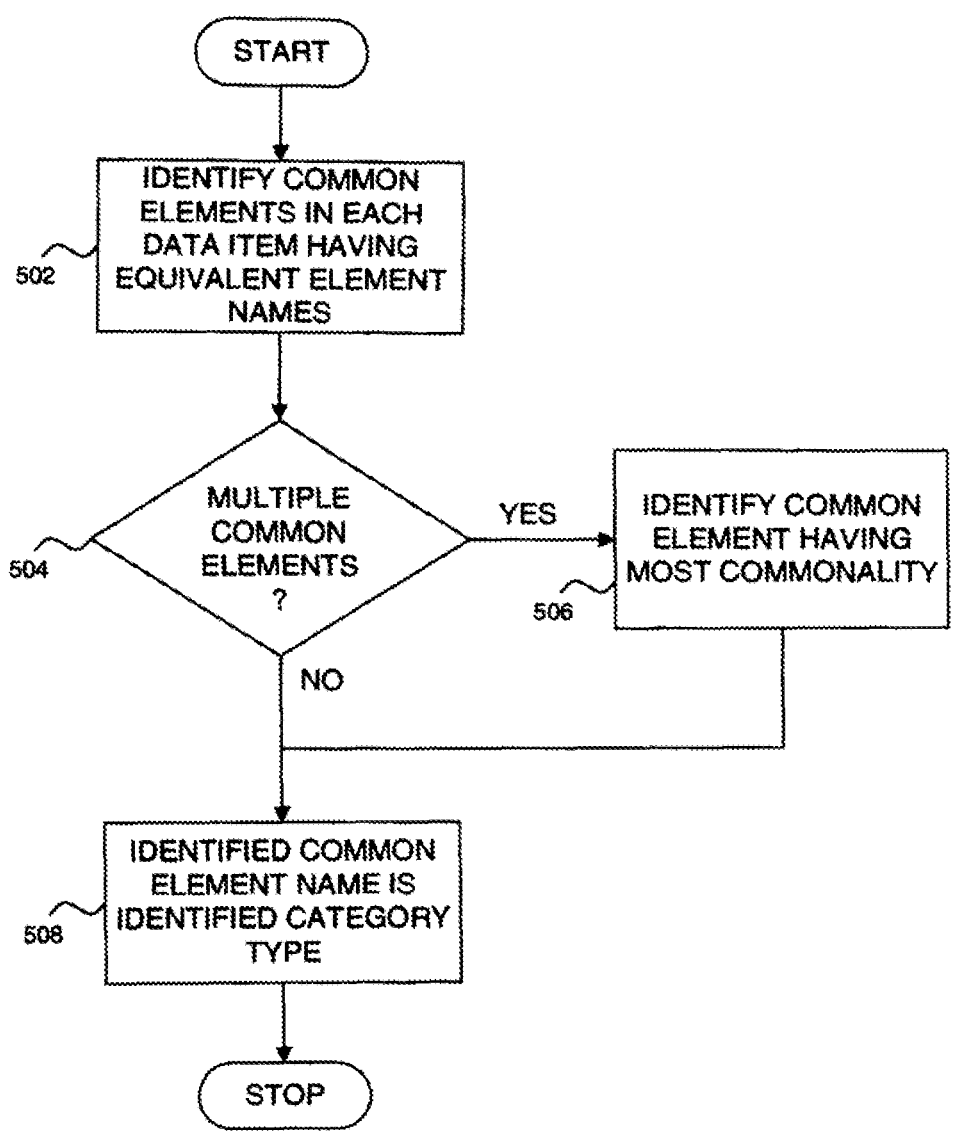
FIG. 5a is a flowchart of a method for the step of FIG. 4 of identifying a category type for a group of data items in accordance with a preferred embodiment of the present invention.

FIG. 5a is a flowchart of a method for the step 402 of FIG. 4 of identifying a category type for a group of data items 302 in accordance with a preferred embodiment of the present invention. Initially, at step 502, the method identifies common data elements. A common data element is a data element which exists in each data item in the set of data items 302 and which has an equivalent data item names. Equivalence of data item names can be determined by: identity of data item names; synonymic equivalence of data item names; or equivalence based upon one or more defined rules of equivalence between data item names. For example, a dictionary of synonyms could be used to determine equivalence between two different data item names, as is well known in the art. For example, the data elements <Name> and <Identity> in exemplary data items 3 and 4 below could be considered equivalent if a synonym dictionary defines the terms Name and Identity as synonymous. Thus, <Name> and <Identity> constitute a common data element in each of exemplary data items 3 and 4 as they are data elements having equivalent names.

| Exemplary data item 3 | Exemplary data item 4 |
|---|---|
| <Name><br>Frank<br></Name><br><Age><br>32<br></Age> | <Identity><br>Frank<br></Identity><br><Height><br>6 foot<br></Height> |

Subsequently, at step 504, the method determines if multiple common data elements were identified at step 502. For example, exemplary data items 5 and 6 below have two common data elements: <Name> and <Identity> can be considered equivalent; and <Age> occurs in each data item, Thus, there are multiple common data elements.

| Exemplary data item 5 | Exemplary data item 6 |
|---|---|
| <Name><br>Frank<br></Name><br><Age><br>32<br></Age> | <Identity><br>Frank<br></Identity><br><Age><br>40<br></Age> |

If step 504 determines that there are multiple common data elements, the method proceeds to step 506 to identify the common data element having the most commonality. One way to determine the common data element with the most commonality is to identify a common data element having the fewest distinct values throughout the entire group of data items. Thus, considering again exemplary data items 5 and 6 above, two common data elements were identified: the synonymous data elements <Name> and <Identity>, and data element <Age>. For the common synonymous data elements <Name> and <Identity>, there is one value in the group of data items of "Frank". For the common data element <Age>, there are two values in the group of data items of "32" and "40". Thus the common synonymous data elements <Name> and <Identity> have most commonality because they have the fewest distinct values in both data items. It will be appreciated that alternative techniques to determine the common data element having the most commonality could be defined depending upon a desired emphasis in the resulting categorization scheme 306.

At step 508 the identified common element name (or the identified common element name with the most commonality, if multiple common element names were identified) is returned by the method of FIG. 5*a* as the identified category type. Where the identified common element name is dependent upon equivalence between multiple different element names, one of the equivalent element names can be selected to be the common element name and thus the identified category type.

It will be appreciated that data items in the group of data items 302 can have different formats. For example, the exemplary data items 7 and 8 below are formatted differently in that data item 7 includes the <Age> data element as nested within an <Attributes> data element whereas data item 8 has no nesting. Notably, the nesting in data item 7 does not affect the equivalence between the <Age> tag of data item 7 and the <Age> tag of data item 8. To appropriately manage such potential nesting and other different formatting characteristics of data items the method of FIG. 5*a* can be adapted to compare only 'leaf' data elements in a data item. A 'leaf' data element is a data element having a value associated therewith (i.e. the data element <Attributes> in data item 7 is not a leaf data element because it only contains nested data elements and it does not contain a data value). Thus, step 502 can alternatively be implemented to identify only common leaf data elements.

| Exemplary data item 7 | Exemplary data item 8 |
|---|---|
| <Name><br>Frank<br></Name><br><Attributes><br><Age><br>32<br></Age><br></Attributes> | <Identity><br>Frank<br></Identity><br><Age><br>40<br></Age> |

It will further be appreciated that an additional form of differing formatting between data items can manifest in the way date elements are named. Exemplary data item 9 below includes an <Age> data element, but has no value associated with it. Instead, data item 9 has a further nested data element <Years> having associated a value. Data item 10, on the other hands simply has a single <Age> data element having a value The differing format of data items 9 and 10 should not affect the equivalence of the data item <Age> in data item 9 and the data item <Age> in data item 10. To manage such differing formats between data items, the method of FIG. 5*a* can be adapted at step 502 to compare data elements which do not necessarily have values associated to identify equivalent data items. Additionally, however, the method of FIG. 5*a* must be adapted at step 506 to identify an appropriate value to be associated with such a data element by parsing nested data items. Thus, data element <Age> in data item 9 could be considered to have associated with it the value "32" which is part of the nested data element <Years>.

| Exemplary data item 9 | Exemplary data item 10 |
|---|---|
| <Name><br>Frank<br></Name><br><Age><br><Years><br>32<br></Years><br></Attributes> | <Identity><br>Frank<br></Identty><br><Age><br>40<br></Age> |

Figure 5B:
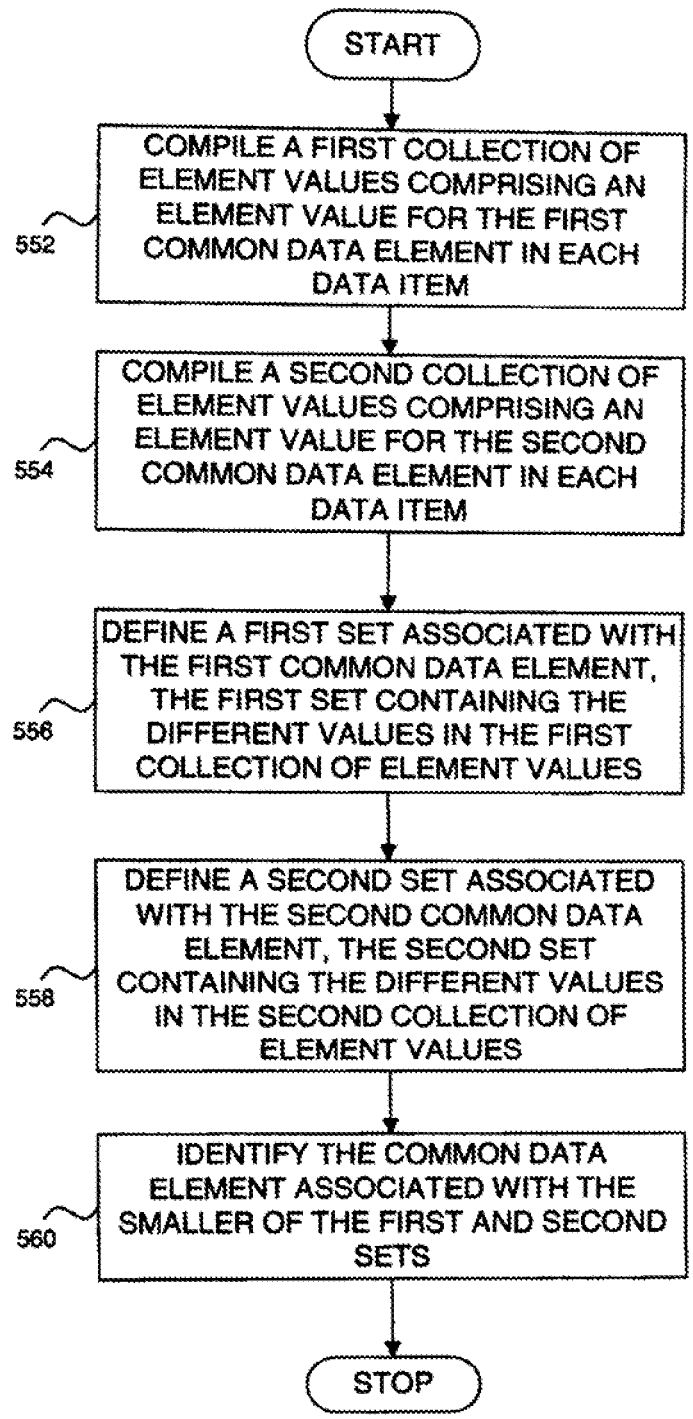
FIG. 5b is a flowchart of an exemplary method for the step of FIG. 5a of identifying a common data element that has the most commonality across a group of data items in accordance with a preferred embodiment of the present invention.

FIG. 5*b* is a flowchart of an exemplary method for the step 506 of FIG. 5*a* of identifying a common data element that has the most commonality across a group of data items 302 in accordance with a preferred embodiment of the present invention. The method of FIG. 5*b* is described in terms of two common data elements: a first common data element, and a second common data element both identified as part of step 502 of FIG. 5*a*. However, it will be appreciated by those skilled in the art that the method of FIG. 5*b* can be extended to handle more than two common data elements by simply scaling the method to process additional common data elements in a way identical to the processing of the two common data elements.

FIG. 5*b* will be described with reference to the exemplary data items 11 and 12 below, having a first common data element <Name> and a second common data element <Age>.

| Exemplary data item 11 | Exemplary data item 12 |
|---|---|
| <Name><br>Frank<br></Name><br><Age><br>32<br></Age> | <Name><br>Frank<br></Name><br><Age><br>40<br></Age> |

Initially, at step 552, the method compiles a first collection of element values comprising an element value for the first common data element in each data item. The first common data element is <Name>, and the collection of element values is therefore: "Frank" (from exemplary data item 11); and "Frank" (from exemplary data item 12).

At step 554 the method compiles a second collection of element values comprising an element value for the second common data element in each data item. The second common data element is <Age>, and the collection of element values is therefore: "32" (from exemplary data item 11); and "40" (from exemplary data item 12).

At step 556 the method defines a first set associated with the first common data element (i.e. associated with <Name>) containing the different values in the first collection of element values. By definition a set includes only 'different' data items. Thus, the first set includes a single item as {"Frank"} and is associated with the first common data element.

At step 558 the method defines a second set associated with the second common data element (i.e. associated with <Age>) containing the different values in the second collection of element values. Thus, the second set includes the items {"32","40"} and is associated with the second common data element.

At step 560 the method identifies the common data element associated with the smaller of the first and second sets. The first set {"Frank"} includes one item whilst the second set {"32","40"} includes two items. Thus the first set is the smaller set. Notably, the size of the set is determined to be the number of items in the set. The common data element associated with the first set is the first common data element. Thus the first common data element is identified by the method of FIG. 5b as being the common data element having the most commonality.

The methods of the present invention described above with respect to FIGS. 4, 5a and 5b will now be considered in use by way of example only with reference to the exemplary groups of data items of FIGS. 6, 9 and 11.

FIG. 6 illustrates an exemplary group of data items 302 suitable for being processed by a preferred embodiment of the present invention to generate a categorization scheme 306. Four data items 602 to 608 are defined as follows, A data item 602 is defined to have three data elements including: data element <ID> having a value of "1"; data element <PRODUCT> having a value of "Apple"; and data element <COLOR> having a value of "Red". A data item 604 is defined to have three data elements including: data element <ID> having a value of "2"; data element <PRODUCT> having a value of "Potato"; and data element <SIZE> having a value of "Large". A data item 606 is defined to have three data elements including, data element <ID> having a value of "3"; data element <PRODUCT> having a value of "Apple"; and data element <COLOR> having a value of "Green". A data item 608 is defined to have three data elements including data element <ID> having a value of "4"; data element <PRODUCT> having a value of "Potato"; and data element <SIZE> having a value of "Small".

The method of FIG. 4 is applied to the data items 602 to 608 to generate a categorization scheme as follows. At step 402 the method identifies a category type for the group of data items 302 using the method of FIG. 5a.

Turning now to FIG. 5a, at step 502 common elements in each data item having equivalent element names are identified. Two such common elements exist for data items 602 to 608: <ID>; and <PRODUCT>. Other data elements, such as <COLOR> occurring in data items 602 and 606 and <SIZE> occurring in data items 604 and 608 are not common date elements because they do not occur in each of the data items as is required by step 502. Subsequently, at step 504, the method determines that multiple common elements have been identified and proceeds to step 506 which is implemented by way of the method of FIG. 5b.

Turning, then, to the method of FIG. 5b, at step 552 a first collection of element values comprising an element value for the first common data element in each data item is compiled. The first common data element is <ID>, and the collection of element values for <ID> are: "1" (from data item 602); "2" (from data item 604); "3" (from data item 606); and "4" (from data item 608). Subsequently at step 554, a second collection of element values comprising an element value for the second common data element in each data item is compiled. The second common data element is <PRODUCT>, and the collection of element values for <PRODUCT> are: "Apple" (from data item 602); "Potato" (from data item 604); "Apple" (from data item 606); and "Potato" (from data item 608). At step 556 a first set is defined associated with the first common data element <ID> having all of the different values from the first collection of element values. Thus, the first set includes the items {"1", "2", "3", "4"}. At step 558 a second set is defined associated with the second common data element <PRODUCT> having all of the different values from the second collection of element values. Thus, the second set includes the items {"Apple","Potato"}. At step 560 the method of FIG. 5b determines that the common data element with the most commonality is that associated with the second set, since the second set has only two items (compared with four items in the first set). Thus, the common data element with most commonality is the second common data element <PRODUCT>. Returning to FIG. 5a, step 508 thus concludes that the data element <PRODUCT> has the most commonality and the identified category type is therefore <PRODUCT>.

Returning now to FIG. 4, step 403 determines that a category type has been identified. At step 404 a set of categories for the category type <PRODUCT> is defined to be a value of a data element having the name of the identified category type. Thus, the set of categories includes the category "Apple" (from data items 602 and 606) and the category "Potato" (from data items 604 and 608). The set of categories is therefore {"Apple", "Potato"}. At step 406 the method loops through these categories. Starting with the category "Apple", step 408 identifies a sub-group of the group of data items belonging to the category "Apple". Data items 602 and 606 both belong to the category "Apple" and so the sub-group contains only these data items. Subsequently, at step 410, the method recurses for the identified sub-group. Notably, the categorized data element <PRODUCT> can be (and in this example, is) removed from the data item prior to recursion to prevent re-categorizing for the same data element.

Considering now FIG. 4 for the sub-group of data items 602 and 606, at step 402 the method identifies a category type for the group of data items 602 and 606 using the method of FIG. 5a.

Turning now to FIG. 5a, at step 502 common elements in each data item 602 and 606 having equivalent element names are identified. Two such common elements exist for data items 602 and 606: <ID>; and <COLOR>. Subsequently, at step 504, the method determines that multiple common elements have been identified and proceeds to step 506 which is implemented by way of the method of FIG. 5b.

Turning, then, to the method of FIG. 5b, at step 552 a first collection of element values comprising an element value for the first common data element in each data item is compiled. The first common data element is <ID> and the collection of element values for <ID> are: "1" (from data item 602); and "3" (from data item 606). Subsequently at step 554, a second collection of element values comprising an element value for the second common data element in each data item is compiled. The second common data element is <COLOR>, and the collection of element values for <PRODUCT> are: "Red" (from data item 602); "Green" (from data item 606). At step 556 a first set is defined associated with the first common data element <ID> having all of the different values from the first collection of element values. Thus, the first set includes the items {"1","3"}. At step 558 a second set is defined associated with the second common data element <COLOR> having all of the different values from the second collection of element values. Thus, the second set includes the items {"Red","Green"}. At step 560 the method of FIG. 5b determines that the common data element with the most commonality is that associated with the smallest set. However, both sets have the same size. In such circumstances, the method could draw upon predefined rules defining which common data element to use, or alternatively could employ interactive tooling to receive an appropriate common data element from a user. For the purpose of demonstration, the common data element <COLOR> is selected. Returning to FIG. 5a, step 508 thus concludes that the data element <COLOR> is identified as the category type.

Returning now to FIG. 4, step 403 determines that a category type has been identified. At step 404 a set of categories for the category type <COLOR> is defined to be a value of a data element having the name of the identified category type. Thus, the set of categories includes the category "Red" (from data item 602) and the category "Green" (from data item 606). The set of categories is therefore {"Red", "Green"}. At step 406 the method loops through these categories. Starting with the category "Red", step 408 identifies a sub-group of the group of data items belonging to the category "Red". Only data item 602 belongs to the category "Red" and so the sub-group contains only one data item. At step 410 the method would recurse for the identified sub-group, however, since only one data item is identified no category type will be identified and the method will terminate. Similarly, the method will terminate for the second category "Green" which contains only one data item.

Returning to FIG. 4 for the second category of <PRODUCT> which is "Potato", step 408 identifies a sub-group of the group of data items belonging to the category "Potato". Data items 604 and 608 both belong to the category "Potato" and so the sub-group contains only these data items. Subsequently, at step 410, the method recurses for the identified sub-group.

Considering now FIG. 4 for the sub-group of data items 604 and 608, at step 402 the method identifies a category type for the group of data items 604 and 608 using the method of FIG. 5a.

Turning now to FIG. 5a, at step 502 common elements in each data item 604 and 608 having equivalent element names are identified. Two such common elements exist for data items 604 and 608: <ID>; and <SIZE>. Subsequently, at step 504, the method determines that multiple common elements have been identified and proceeds to step 506 which is implemented by way of the method of FIG. 5b.

Turning, then, to the method of FIG. 5b: at step 552 a first collection of element values comprising an element value for the first common data element in each data item is compiled. The first common data element is <ID>, and the collection of element values for <ID> are: "2" (from data item 604); and "4" (from data item 608). Subsequently at step 554, a second collection of element values comprising an element value for the second common data element in each data item is compiled. The second common data element is <SIZE>, and the collection of element values for <SIZE> are: "Large" (from data item 604); "Small" (from data item 608). At step 556 a first set is defined associated with the first common data element <ID> having all of the different values from the first collection of element values, Thus, the first set includes the items {"2","4"}. At step 558 a second set is defined associated with the second common data element <SIZE> having all of the different values from the second collection of element values. Thus, the second set includes the items {"Large","Small"}. At step 560 the method of FIG. 5b determines that the common data element with the most commonality is that associated with the smallest set. However, both sets have the same size. In such circumstances, the method could draw upon predefined rules defining which common data element to use, or alternatively could employ interactive tooling to receive an appropriate common data element from a user. For the purpose of demonstration, the common data element <SIZE> is selected, Returning to FIG. 5a step 508 thus concludes that the data element <SIZE> is identified as the category type.

Returning now to FIG. 4, step 403 determines that a category type has been identified. At step 404 a set of categories for the category type <SIZE> is defined to be a value of a data element having the name of the identified category type, Thus, the set of categories includes the category "Large" (from data item 604) and the category "Small" (from data item 608). The set of categories is therefore {"Large", "Small"}. At step 406 the method loops through these categories. Starting with the category "Large", step 408 identifies a sub-group of the group of data items belonging to the category "Large". Only data item 602 belongs to the category "Large" and so the sub-group contains only one data item. At step 410 the method would recurse for the identified sub-group, however, since only one data item is identified no category type will be identified and the method will terminate. Similarly, the method will terminate for the second category "Small" which contains only one data item.

The method of FIG. 4 subsequently returns from it's recursion at step 410 and determines at step 412 than there are no further categories to process (beyond "Apple" and "Potato"). The method of FIG. 4 thus terminates.

In this way a categorization scheme 306 is generated for the data items of FIG. 6. FIG. 7 illustrates the categorization scheme 306 arising from an application of a preferred embodiment of the present invention to the exemplary group of data items of FIG. 6. FIG. 7 illustrates the two categories identified as "Apple" 710 and "Potato" 720. The "Apple" category 710 includes sub-category "Red" 712, into which the data item 602 could be categorized as data item 716. The "Apple" category 710 further includes sub-category "Green" 714 into which the data item 606 could be categorized as data item 718. The "Potato" category 720 includes sub-category "Large" 722, into which the data item 604 could be categorized as data item 726. The "Potato" category 720 further includes sub-category "Small" 724, into which the data item 608 could be categorized as data item 728. Notably, data items 716, 718, 726 and 728 categorized into the category scheme of FIG. 7 include only those data elements not used to form part of the categorization scheme itself. Thus, only the <ID> data element exists in each of these data items. The categorization scheme itself serves to provide the remainder of the data elements constituting these data items. In this way the storage requirement for each data element is reduced since it is centralized into the categorization scheme itself. Thus, the preferred embodiment of the present invention described herein provides for the dynamic generation of a categorization scheme 306 for data items 302 of disparate origin and format without a need for the generation of an intermediate mapping between data items and the categorization scheme.

Figure 8:
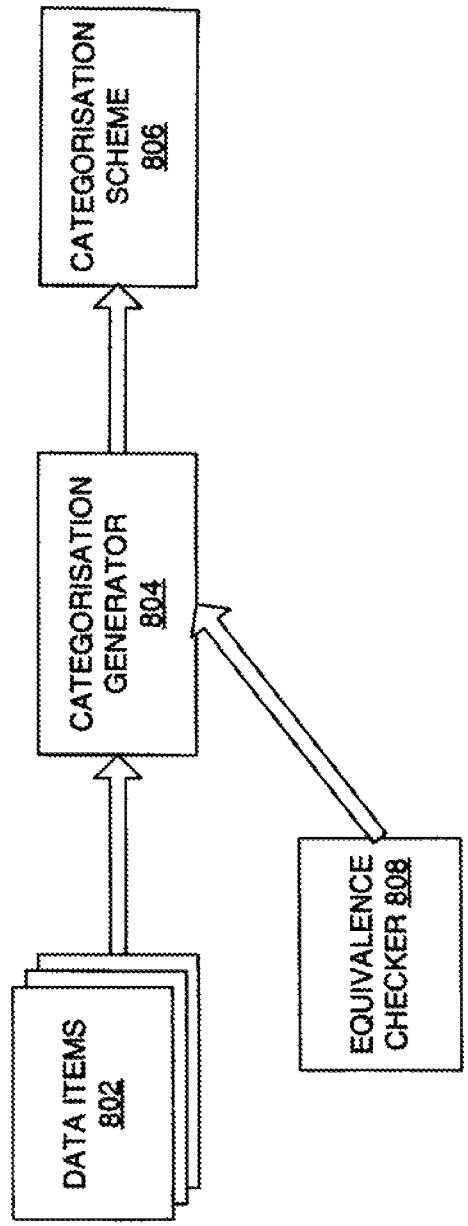
FIG. 8 is a block diagram of an arrangement for generating a categorization scheme derived from a group of data items in accordance with an alternative embodiment of the present invention.

FIG. 8 is a block diagram of an arrangement for generating a categorization scheme 806 derived from a group of data items 802 in accordance with an alternative embodiment of the present invention. Many of the elements of FIG. 8 are identical to those described above with respect to FIG. 3 including Categorisation Generator 804 and Categorisation Scheme 806. FIG. 8 further includes an equivalence checker 808 which is a hardware or software component for determining equivalence between two data element names. For example, the equivalence checker can employ word synonyms or other word relationship rules to define how different data element names are to be considered equivalent. Further, in the alternative embodiment, the method of FIG. 4 at step 402 and the method of FIG. 5a at step 502 are adapted to only process leaf data elements in data items. That is, only data elements having associated values are processed. This is a technique for overcoming the differences in the formats of data items as described above with respect to FIG. 5a.

FIG. 9 illustrates an exemplary group of data items 902, 904, 906 and 908 suitable for being processed by a preferred or an alternative embodiment of the present invention to generate a categorization scheme 806. The four data items 902 to 908 are defined as follows. A data item 902 is defined to have the following data elements: data element <TRANSMISSION> having a value of "Manual"; and data element <CONFIGURATION> having nested data elements: <STYLE> having a value of "Convertible"; <DOORS> having a value of "2"; and <COL> having a value of "Red".

A data item 904 is defined to have the following data elements: data element <BODY> having a value of "Convertible"; and data element <XMISSION> having a value of "Automatic"; and a data element <DOORS> having a value of "2".

A data item 906 is defined to have the following data elements: data element <VEHICLETYPE> having a value of "Convertible"; data element <ENGINESIZE> having a value of "2.8I"; data element <TECHNICAL> having nested data elements: <GEARBOX> having a value of "Manual"; <AUTOOPTION> having a value of "No"; and <CRUISE> having a value of "Yes"; and data element <COLOR> having a value of "Green".

A data item 908 is defined to have the following data elements: data element <STYLE> having a value of "Convertible"; and data element <SPECIFICATION> having nested data elements: <COSMETIC>; and <TECHNICAL>. The nested data element <COSMETIC> further has nested data elements: <COLOR> having a value of "Red"; and <HOOD> having a value of "Red". The nested data element <TECHNICAL> further has nested data elements: <XMISSION> having a value of "Automatic"; and <ENGINE> having a value of "3I".

An equivalence checker 808 is further defined to specify the equivalence of the following terms:

TABLE 1

Equivalence Checker Terms

| Equivalent Term 1 | Equivalent Term 2 | Equivalent Term 3 |
|---|---|---|
| TRANSMISSION | XMISSION | GEARBOX |
| STYLE | BODY | VEHICLETYPE |
| COLOR | COLOUR | COL |
| ENGINE | ENGINESIZE | ENGINECAPACITY |

Thus, based on the definitions in Table 1 above, the terms: Transmission, Xmission, and Gearbox are considered equivalent. Similarly for the terms: Style; Body; and Vehicletype, and so on.

The method of FIG. 4 is applied to the data items 902 to 908 to generate a categorization scheme as follows. At step 402 the method identifies a category type for the group of data items 302 using the method of FIG. 5a.

Turning now to FIG. 5a, at step 502 common elements in each data item having equivalent element names are identified, referring only to leaf data elements. Two such common elements exist for data items 902 to 908: <STYLE> (which is equivalent to <BODY> and <VEHICLETYPE> and will hereinafter be referred to as <STYLE>); and <TRANSMISSION> (which is equivalent to <XMISSION> and <GEARBOX> and will hereinafter be referred to as <TRANSMISSION>). Other data elements, such as <DOORS> occurring in data items 902 and 904 and <COL> or <COLOR> occurring in data items 902, 906 and 908 are not common date elements because they do not occur in each of the data items as is required by step 502. Subsequently, at step 504, the method determines that multiple common elements have been identified and proceeds to step 506 which is implemented by way of the method of FIG. 5b.

Turning, then, to the method of FIG. 5b, at step 552 a first collection of element values comprising an element value for the first common data element in each data item is compiled. The first common data element is <STYLE>, and the collection of element values for <STYLE> are: "Convertible" (from <STYLE> in data item 902); "Convertible" (from the equivalent data element of <BODY> in data item 904); "Convertible" (from equivalent data element of <VEHICLETYPE> in data item 906); and "Convertible" (from <STYLE> in data item 908). Subsequently at step 554, a second collection of element values comprising an element value for the second common data element in each data item is compiled. The second common data element is <TRANSMISSION>, and the collection of element values for <TRANSMISSION> are: "Manual" (from <TRANSMISSION> in data item 902); "Automatic" (from the equivalent data element of <XMISSION-> in data item 904); "Manual" (from the equivalent data element of <GEARBOX> in data item 906); and "Automatic" (from the equivalent data element of <XMISSION> in data item 908).

At step 556 a first set is defined associated with the first common data element <STYLE> having all of the different values from the first collection of element values. Thus, the first set includes the item {"Convertible"}. At step 558 a second set is defined associated with the second common data element <TRANSMISSION> having all of the different values from the second collection of element values. Thus, the second set includes the items {"Manual","Automatic"}. At step 560 the method of FIG. 5b determines that the common data element with the most commonality is that associated with the first set, since the first set has only one item (compared with two items in the second set). Thus, the common data element with most commonality is the first common data element <STYLE>. Returning to FIG. 5a, step 508 thus concludes that the data element <STYLE> has the most commonality and the identified category type is therefore <STYLE>.

Returning now to FIG. 4, step 403 determines that a category type has been identified. At step 404 a set of categories for the category type <STYLE> is defined to be a value of a data element having the name of the identified category type. Thus, the set of categories includes only the category "Convertible" (from data items 902, 904, 906 and 908). The set of categories is therefore {"Convertible"}. At step 406 the method loops through this single category and at step 408 identifies a sub-group of the group of data items belonging to the category "Convertible". Since all data items 902 to 908 belong to the category "Convertible", all data items 902 to 908 are included in the sub-group. Subsequently, at step 410, the method recurses for the identified sub-group. Notably, the categorized data element <STYLE> can be (and in this example, is) removed from the data item prior to recursion to prevent re-categorizing for the same data element.

The method of FIG. 4 is now applied to the data items 902 to 908 to generate a sub-categorization scheme from the category "Convertible" as follows. At step 402 the method identifies a category type for the group of data items 302 using the method of FIG. 5a.

Turning now to FIG. 5a, at step 502 common elements in each data item having equivalent element names are identified, referring only to leaf data elements. Only one such common element exists for data items 902 to 908:<TRANSMISSION> (which is equivalent to <XMISSION> and <GEARBOX> and will hereinafter be referred to as <TRANSMISSION>). The data element <STYLE> (and it's equivalents) has been removed form the data items 902 to 908 and so this no longer constitutes a common data element. Subsequently, at step 504, the method determines that no multiple common elements have been identified and proceeds to step 508 which concludes that the data element <TRANSMISSION> is identified as the category type Returning now to FIG. 4, step 403 determines that a category type has been identified as <TRANSMISSION>. At step 404 a set of categories for the category type <TRANSMISSION> is defined to be a value of a data element having the name of the identified category type. Thus, the set of categories includes: "Manual" (from data items 902 and 906); and "Automatic" (from data items 904 and 908). The set of categories is therefore {"Manual","Automatic"}. At step 406 the method loops through these categories. Starting with the category "Manual", step 408 identifies a sub-group of the group of data items belonging to the category "Manual". Data items 902 and 906 both belong to the category "Manual" and so the sub-group contains only these data items. Subsequently, at step 410, the method recurses for the identified sub-group. Notably, the categorized data element <TRANSMISSION> is removed from the data items in the sub-group prior to recursion to prevent re-categorizing for the same data element.

The method of FIG. 4 is now applied to the data items 902 and 906 to generate a sub-categorization scheme from the category "Manual" as follows. At step 402 the method identifies a category type for the group of data items 302 using the method of FIG. 5a.

Turning now to FIG. 5a, at step 502 common elements in each data item having equivalent element names are identified, referring only to leaf data elements. Only one such common element exists for data items 902 and 906: <COLOR> (which is equivalent to <COL> and will hereinafter be referred to as <COLOR>), The data element <TRANSMISSION> (and it's equivalents) has been removed form the data items 902 and 906 and so this no longer constitutes a common data element. Subsequently, at step 504, the method determines that no multiple common elements have been identified and proceeds to step 508 which concludes that the data element <COLOR> is identified as the category type.

Returning now to FIG. 4, step 403 determines that a category type has been identified as <COLOR>. At step 404 a set of categories for the category type <COLOR> is defined to be a value of a data element having the name of the identified category type. Thus, the set of categories includes: "Red" (from data item 902); and "Green" (from data item 908). The set of categories is therefore {"Red","Green"}. At step 406 the method loops through these categories. Starting with the category "Red", step 408 identifies a sub-group of the group of data items belonging to the category "Red". Only data item 902 belongs to the category "Red" and so the sub-group contains only this data item. At step 410 the method would recurse for the identified sub-group, however, since only one data item is identified no category type will be identified and the method will terminate. Similarly, the method will terminate for the second category "Green" which contains only one data items being data item 906.

Returning from the present recursion of the method of FIG. 4, the category "Automatic", is next processed at step 406. Step 408 identifies a sub-group of the group of data items belonging to the category "Automatic". Data items 904 and 908 belong to the category "Automatic" and so the subgroup contains only these data items. At step 410 the method would recurse for the identified sub-group, however, since the data items in the sub-group contain no further common data elements, no category type will be identified and the method will terminate. For simplicity, this processing will not be covered here.

Figure 10:
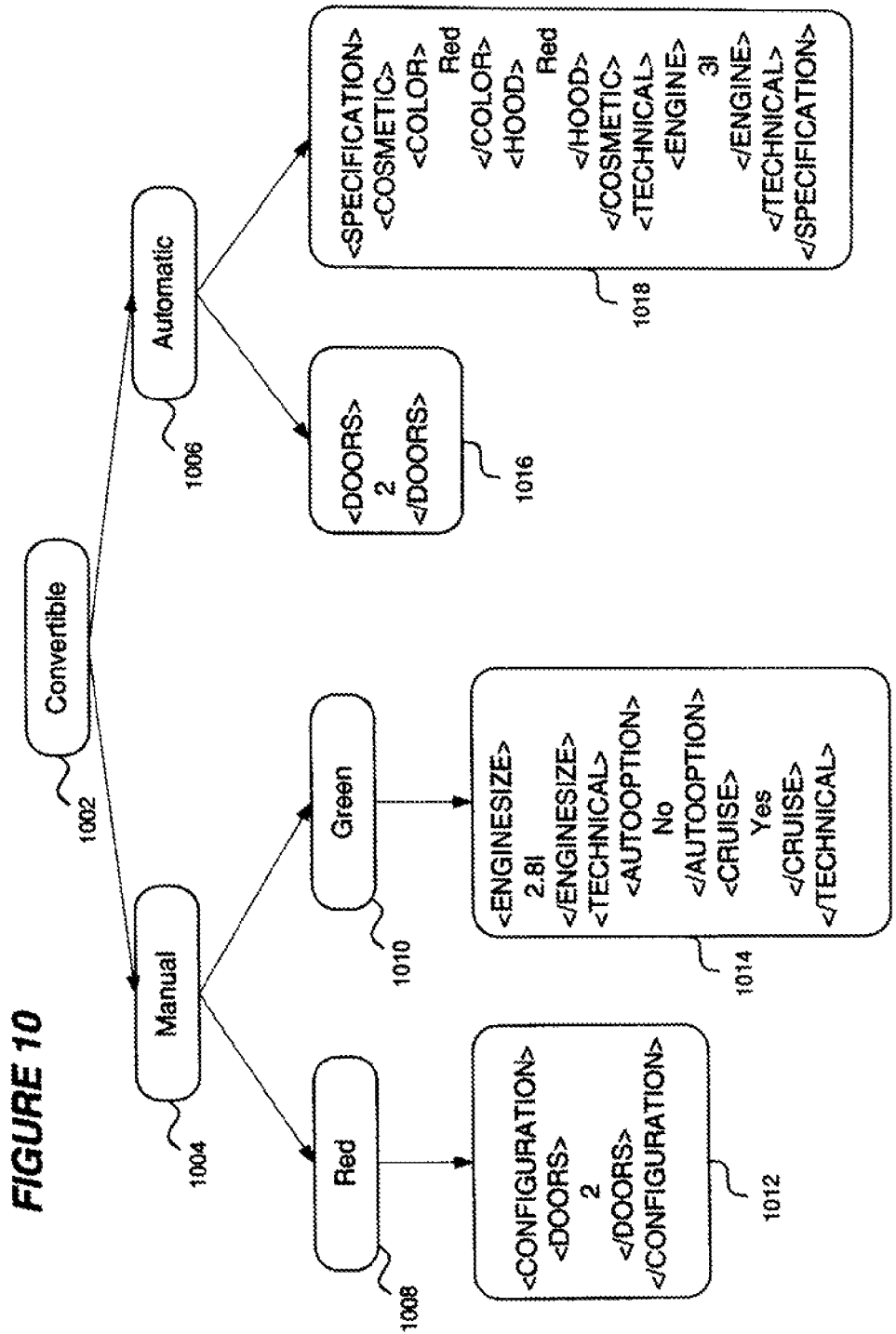
FIG. 10 illustrates a categorization scheme arising from an application of a preferred or an alternative embodiment of the present invention to the exemplary group of data items of FIG. 9.

In this way a categorization scheme 806 is generated for the data items of FIG. 9. FIG. 10 illustrates the categorization scheme 806 arising from an application of an alternative embodiment of the present invention to the exemplary group of data items of FIG. 9. FIG. 10 illustrates an initial category of "Convertible" 1002 having two sub-categories of "Manual" 1004 and "Automatic" 1006. The "Manual" category 1004 itself has two sub-categories of "Red" 1008 and "Green" 1010. The data items 902 to 908 are also illustrated as being categorized in the categorization scheme 806 of FIG. 10, with: data item 902 being categorized as data item 1012 as a "Red" "Manual" "Convertible"; data item 904 being categorized as data item 1016 as an "Automatic" "Convertible"; data item 906 being categorized as data item 1014 as a "Green" "Manual" "Convertible"; and data item 908 being categorized as data item 1018 as an "Automatic" "Convertible". Thus, the alternative embodiment of the present invention described herein provides for the dynamic generation of a categorization scheme 806 for data items 802 of disparate origin and/or format without a need for the generation of an intermediate mapping between data items and the categorization scheme.

The invention claimed is:
1. A computer-implemented method for generating a categorization scheme, comprising:
receiving a plurality of data items having different formats;
respectively identifying, in at least two of the plurality of data items, equivalent yet different element names;

identifying, in the at least two of the plurality of data items, a common data element based upon the equivalent yet different element names;
identifying a category type, for the common data element, using a selected one of the equivalent yet different element names; and
generating the categorization scheme using the identified category type.

2. The method of claim 1, further comprising:
identifying a plurality of common data elements; and
selecting one of the plurality of common data elements having a most commonality.

3. The method of claim 2, wherein
the one of the plurality of common data elements having the most commonality being selected is based upon a fewest distinct values throughout the plurality of data items.

4. The method of claim 1, wherein
the plurality of data items are formatted using Extensible Markup Language (XML).

5. The method of claim 1, wherein
the categorization scheme is a set of categories arranged as a tree data structure with a root category and a plurality of sub-categories.

6. The method of claim 1, further comprising:
defining a set of sub-categories for the identified category type; and
for each sub-category in the set of sub-categories,
identifying a subgroup of the plurality of data items belonging to the sub-category, and
identifying a sub-category type for a common data element within the subgroup of the plurality of data items.

7. The method of claim 6, further comprising:
removing, from the subgroup of the plurality of data items, data elements related to a parent category of the sub-category.

8. A computer hardware system configured to generate a categorization scheme, comprising:
at least one processor, wherein the at least one processor is configured to initiate and/or perform:
receiving a plurality of data items having different formats;
respectively identifying, in at least two of the plurality of data items, equivalent yet different element names;
identifying, in the at least two of the plurality of data items, a common data element based upon the equivalent yet different element names;
identifying a category type, for the common data element, using a selected one of the equivalent yet different element names; and
generating the categorization scheme using the identified category type.

9. The system of claim 8, wherein the at least one processor is further configured to initiate and/or perform:
identifying a plurality of common data elements; and
selecting one of the plurality of common data elements having a most commonality.

10. The system of claim 9, wherein
the one of the plurality of common data elements having the most commonality being selected is based upon a fewest distinct values throughout the plurality of data items.

11. The system of claim 8, wherein
the plurality of data items are formatted using Extensible Markup Language (XML).

12. The system of claim 8, wherein
the categorization scheme is a set of categories arranged as a tree data structure with a root category and a plurality of sub-categories.

13. The system of claim 8, wherein the at least one processor is further configured to initiate and/or perform:
defining a set of sub-categories for the identified category type; and
for each sub-category in the set of sub-categories,
identifying a subgroup of the plurality of data items belonging to the sub-category, and
identifying a sub-category type for a common data element within the subgroup of the plurality of data items.

14. The system of claim 9, wherein the at least one processor is further configured to initiate and/or perform:
removing, from the subgroup of the plurality of data items, data elements related to a parent category of the sub-category.

15. A computer-usable storage medium, comprising:
computer-usable program code stored therein for generating a categorization scheme, the computer-usable program code, which when executed on a computer hardware system, causes the computer hardware system to perform:
receiving a plurality of data items having different formats;
respectively identifying, in at least two of the plurality of data items, equivalent yet different element names;
identifying, in the at least two of the plurality of data items, a common data element based upon the equivalent yet different element names;
identifying a category type, for the common data element, using a selected one of the equivalent yet different element names; and
generating the categorization scheme using the identified category type.

16. The computer-usable storage medium of claim 15, wherein the computer-usable program code further cause the computer hardware system to perform:
identifying a plurality of common data elements; and
selecting one of the plurality of common data elements having a most commonality.

17. The computer-usable storage medium of claim 16, wherein
the one of the plurality of common data elements having the most commonality being selected is based upon a fewest distinct values throughout the plurality of data items.

18. The computer-usable storage medium of claim 15, wherein
the plurality of data items are formatted using Extensible Markup Language (XML).

19. The computer-usable storage medium of claim 15, wherein
the categorization scheme is a set of categories arranged as a tree data structure with a root category and a plurality of sub-categories.

20. The computer-usable storage medium of claim 15, wherein the computer-usable program code further cause the computer hardware system to perform:
defining a set of sub-categories for the identified category type; and
for each sub-category in the set of sub-categories,
identifying a subgroup of the plurality of data items belonging to the sub-category, and identifying a sub-category type for a common data element within the subgroup of the plurality of data items.

21. The computer-usable storage medium of claim 20, wherein the computer-usable program code further cause the computer hardware system to perform:

removing, from the subgroup of the plurality of data items, data elements related to a parent category of the sub-category.

* * * * *